(No Model.)
W. M. McDOUGALL.
SECONDARY BATTERY.
No. 537,475. Patented Apr. 16, 1895.
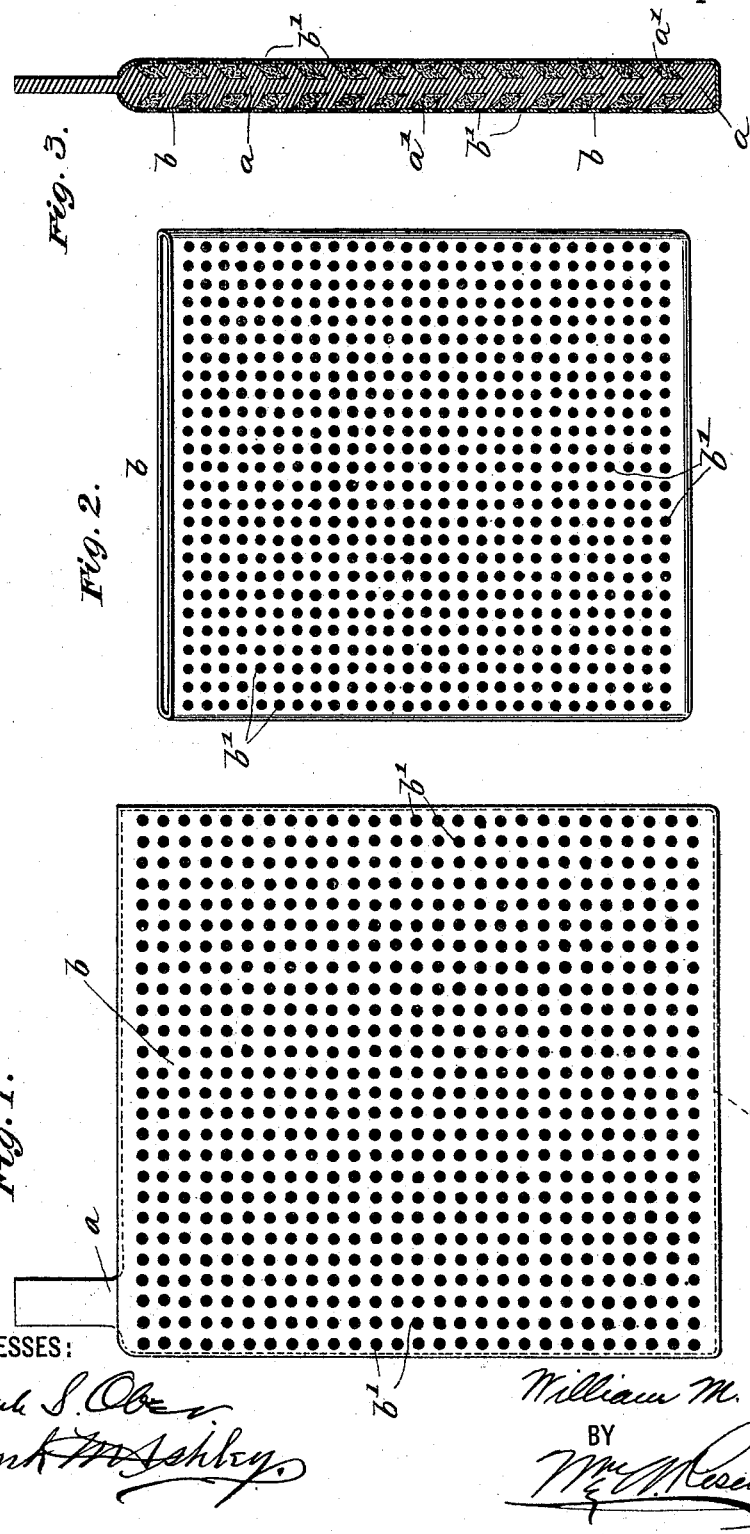

UNITED STATES PATENT OFFICE.

WILLIAM M. McDOUGALL, OF EAST ORANGE, NEW JERSEY.

SECONDARY BATTERY.

SPECIFICATION forming part of Letters Patent No. 537,475, dated April 16, 1895.

Application filed August 2, 1894. Serial No. 519,235. (No model.)

*To all whom it may concern:*

Be it known that I, WILLIAM M. McDOUGALL, a citizen of the United States, residing at East Orange, in the county of Essex and State of New Jersey, have invented certain new and useful Improvements in Secondary Batteries, of which the following is a full, clear, and exact description.

My invention relates to secondary batteries, the object being to provide means for effectually holding the active material carried by the electrode in place.

The invention consists of the combination with an electrode to which is mechanically or otherwise applied the oxide of lead or other active material, of an envelope made of elastic material and of somewhat smaller size than the electrodes, the envelope being adapted to be stretched over the electrode, so that when in place it will exert a slight pressure against the electrodes and thus prevent the displacement of active material carried by it. The envelope which I prefer to use is made of soft rubber and will contain a large number of perforations to permit of contact between the electrolyte and the electrode.

In the accompanying drawings: Figure 1 represents a side view of one of the electrodes of a secondary battery fitted with my invention. Fig. 2 is a side view of the envelope without the electrode, and Fig. 3 is a cross section of the electrode with the envelope applied thereto.

Referring to the drawings by letter, $a$ represents the electrode, which may be of lead, copper or other material commonly used for this purpose. $a'$ represents the active material carried by it and deposited in pockets of any form.

$b$ represents the envelope of elastic material, such as soft rubber. This will be made in the form of a pocket similar in shape to the electrode, but slightly smaller, so that it will have to be stretched in all directions to apply it to the electrode. The sides of the envelope will be provided with numerous perforations of smaller size, indicated by $b'$, and it will be applied to the electrode by stretching and sliding the electrode into it until the latter is entirely covered. The open side of the pocket may be sealed if desired, to more perfectly hold it in place.

The invention is not confined to any particular form of electrode. It may be an electrode to which the active material is mechanically applied, or it may be an electrode of the "Planté" type, my invention consisting broadly in the use of an elastic envelope which in its normal condition is smaller than the electrode to which it is applied.

The envelope being of soft rubber serves the additional purpose of insulating the electrodes of a cell from each other.

Having thus described my invention, I claim—

1. The combination with a secondary battery electrode, of an envelope for the same consisting of elastic material, the normal size of which is smaller than the electrode, so that it will have to be stretched to embrace the electrode.

2. The combination with a secondary battery electrode, of an envelope for the same consisting of elastic material, the normal size of which is smaller than the electrode, so that it will have to be stretched to embrace the electrode, the sides of the envelope being perforated.

In testimony whereof I subscribe my signature in presence of two witnesses.

WILLIAM M. McDOUGALL.

Witnesses:
FRANK S. OBER,
WM. A. ROSENBAUM.